(12) United States Patent
Xie

(10) Patent No.: US 11,308,829 B2
(45) Date of Patent: Apr. 19, 2022

(54) DISPLAY PANEL AND DISPLAY DEVICE

(71) Applicant: Yungu (Gu'an) Technology Co., Ltd., Langfang (CN)

(72) Inventor: Wen Xie, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 175 days.

(21) Appl. No.: 16/923,491

(22) Filed: Jul. 8, 2020

(65) Prior Publication Data

US 2020/0342790 A1 Oct. 29, 2020

Related U.S. Application Data

(63) Continuation of application No. PCT/CN2019/089294, filed on May 30, 2019.

(30) Foreign Application Priority Data

Nov. 30, 2018 (CN) .......................... 201811457584.X

(51) Int. Cl.
*G09F 9/30* (2006.01)
(52) U.S. Cl.
CPC .................... *G09F 9/301* (2013.01)
(58) Field of Classification Search
CPC combination set(s) only.
See application file for complete search history.

(56) References Cited

U.S. PATENT DOCUMENTS

| 10,043,827 | B2* | 8/2018 | Kwon | ............... G02F 1/133305 |
| 10,749,139 | B2* | 8/2020 | Lee | ..................... H01L 51/5253 |
| 10,777,101 | B2* | 9/2020 | Park | ..................... G06F 1/1652 |
| 11,068,029 | B2* | 7/2021 | Jeong | ..................... G06F 1/1626 |
| 2018/0053790 | A1* | 2/2018 | Kwon | ................... H01L 23/562 |
| 2020/0388197 | A1* | 12/2020 | Park | ......................... H01L 51/56 |

FOREIGN PATENT DOCUMENTS

| CN | 106782091 A | 5/2017 |
| CN | 206627869 U | 11/2017 |
| CN | 107871451 A | 4/2018 |
| CN | 107976725 A | 5/2018 |
| CN | 108205973 A | 6/2018 |
| CN | 108281387 A | 7/2018 |
| CN | 108305880 A | 7/2018 |
| CN | 207799301 U | 8/2018 |

(Continued)

OTHER PUBLICATIONS

ISR_for_International_Application_PCTCN2019089294.
(Continued)

*Primary Examiner* — Lisa Lea-Edmonds
(74) *Attorney, Agent, or Firm* — Ladas & Parry LLP

(57) ABSTRACT

The application discloses a display panel and a display device. The display panel includes a substrate. The substrate includes a bonding region and a bend region connected to the bonding region. The substrate further includes a support block disposed corresponding to the bend region and the bonding region and disposed on a side of the substrate facing away from a display surface. The maximum thickness of the support block located in the bonding region is greater than the maximum thickness of the support block located in the bend region.

20 Claims, 5 Drawing Sheets

(56) References Cited

FOREIGN PATENT DOCUMENTS

| CN | 108597380 A | 9/2018 |
|----|-------------|--------|
| CN | 108628500 A | 10/2018 |
| CN | 108735103 A | 11/2018 |
| CN | 108766246 A | 11/2018 |
| CN | 109285461 A | 1/2019 |

OTHER PUBLICATIONS

First Search of CN 201811457584.X Prior Application.
OA1 of CN 201811457584.X Prior Application.
OA1 of CN 201811457584.X Prior Application Translation.
CN 109285461 A _ English Abstract.
CN 108766246 A _ English Abstract.
CN 107871451 A _ English Abstract.
CN 108305880 A _ English Abstract.
CN 108597380 A _ English Abstract.
CN 108735103 A _ English Abstract.
CN 108628500 A _ English Abstract.
CN 108205973 A _ English Abstract.
CN 206627869 U _ English Abstract.
CN 107976725 A _ English Abstract.
CN 108281387 A _ English Abstract.
CN 106782091 A _ English Abstract.
CN 207799301 U _ English Abstract.

\* cited by examiner

DISPLAY PANEL AND DISPLAY DEVICE

CROSS REFERENCE TO RELATED APPLICATIONS

The present application is a continuation of International Patent Application No. PCT/CN2019/089294, filed on May 30, 2019, which is based on and claims priority to Chinese patent application 201811457584.X filed with the CNIPA on Nov. 30, 2018, disclosures of which are incorporated herein by reference in their entireties.

TECHNICAL FIELD

The present application relates to the field of display technology and, in particular, to a display panel and a display device.

BACKGROUND

In recent years, in order to improve the screen-to-body ratio, achieve full-screen display of a display device and provide a better watching experience for users, it is needed to bend the bonding region to the back for the purpose of reducing the size of the bezel. However, during the bending process, wiring in the bend region is easily broken, causing the bending process to fail and thereby causing a display failure of the display device.

SUMMARY

The present application provides a display panel and a display device. The risk of wiring breakage in the bend region of the display panel is reduced and the yield of the display panel is improved.

The present application provides a display panel. The display panel includes a substrate. The substrate includes a bonding region and a bend region connected to the bonding region. The substrate further includes a support block disposed corresponding to the bend region and the bonding region and disposed on a side of the substrate facing away from a display surface. A maximum thickness of the support block located in the bonding region is greater than a maximum thickness of the support block located in the bend region.

In an embodiment, a thickness of a side, away from the bonding region, of the support block located in the bend region is less than or equal to a thickness of any other part of the support block located in the bend region. In this manner, the support block can support the bend region while the bending difficulty of the bend region is reduced, so that a distorted bending of the bend region caused by stress from a first region and the bonding region to the bend region is prevented and wiring breakage is prevented.

In an embodiment, the support block located in the bend region is uniform in thickness.

In an embodiment, the thickness of a side, away from the bonding region, of the support block located in the bend region is less than or equal to a minimum thickness of the support block located in the bonding region. In this manner, the bending difficulty of the bend region can be prevented from increasing, and the supporting and fixing effects of the support block can be guaranteed.

In an embodiment, the maximum thickness of the support block located in the bend region is less than or equal to the minimum thickness of the support block located in the bonding region. In this manner, the bending difficulty caused by a too great thickness of the bend region is prevented while the support block can support the bend region. Moreover, in terms of the thickness, the support block located in the bonding region, can well replace a raising block in the related art, and thus there is no need to dispose the raising block additionally. Therefore, alignment is not required during attachment and the attachment difficulty is reduced.

In an embodiment, the thickness, perpendicular to the substrate, of the support block located in the bend region increases gradually.

In an embodiment, the thickness of the support block located in the bend region changes in a wave shape.

In an embodiment, the thickness of the support block located in the bend region increases continuously or step-wise.

In an embodiment, a minimum thickness of the support block located in the bend region is in a range of 5-30 µm. In this manner, the support block may support and fix the bend region, while the bending difficulty of the bend region may be reduced when the bend region is being bent.

In an embodiment, at least part of the support block located in the bonding region is uniform in thickness. The support block in the bonding region includes a part with a uniform thickness, and a plane formed by the part, with a uniform thickness, of the support block located in the bonding region is in contact with a second surface, so that the bend region may be fixed.

In an embodiment, the support block located in the bonding region is uniform in thickness.

In an embodiment, along the direction from the bend region to the bonding region, the thickness of the support block located in the bonding region increases and then remains unchanged.

In an embodiment, the substrate further includes a first region, and the first region is located on a side of the bend region away from the bonding region.

A support layer is disposed corresponding to the first region and disposed on a side of the substrate facing away from the display surface. With the bend region being bent, the support block located in the bonding region and having the maximum thickness abuts a side of the support layer facing away from the substrate. The support layer is disposed in the first region so that the support layer may support the first region of the display panel.

In an embodiment, the display panel further includes a buffer layer and a heat dissipation layer. The buffer layer is disposed on the side of the support layer facing away from the substrate and the heat dissipation layer is disposed on a side of the buffer layer facing away from the support layer.

In an embodiment, with the bend region being bent, the bonding region is disposed in parallel with the first region. In this manner, the bending shape of the bend region is in a semi-arc shape and dead fold may be effectively prevented.

The present application further provides a display device. The display device includes the display panel provided by any one of embodiments of the present application.

DETAILED DESCRIPTION

Figure 1:
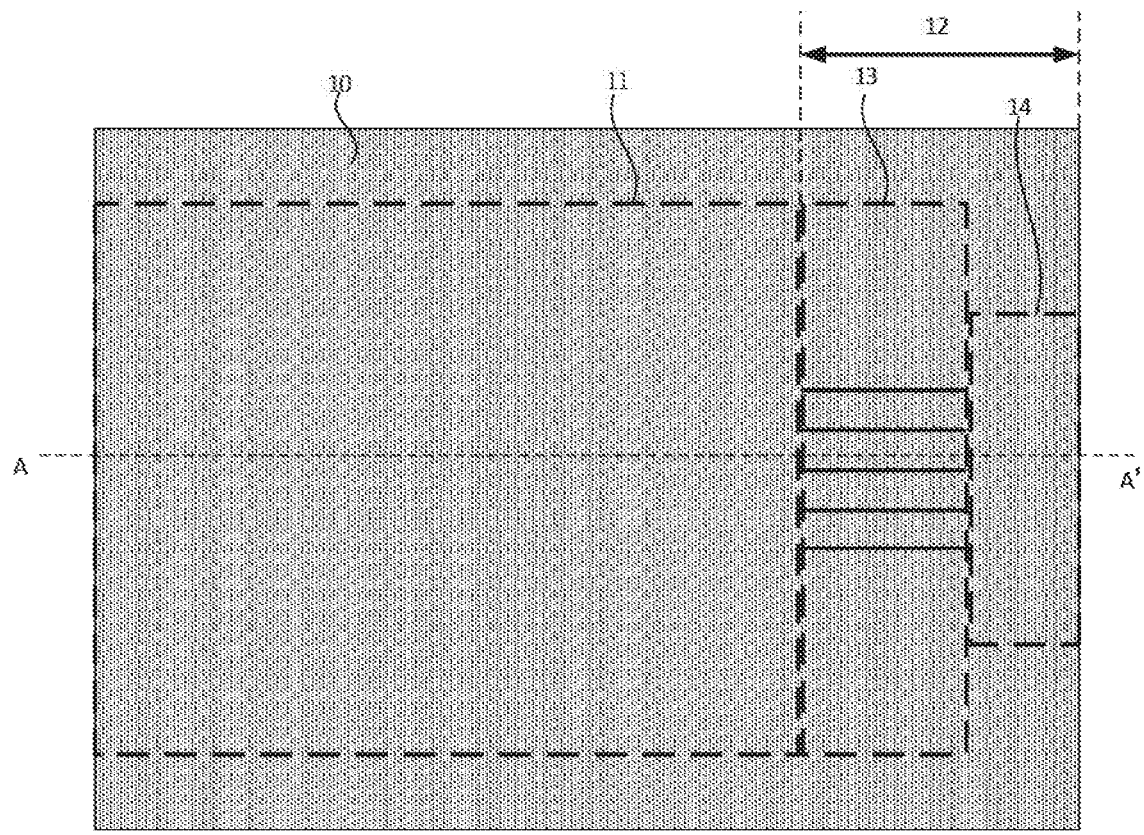
FIG. 1 is a top view of a display panel according to an embodiment of the present application.

The present application will be further described in detail with reference to the drawings and embodiments. The embodiments set forth below are intended to illustrate and not to limit the present application. In order to facilitate description, only part, not all, of structures related to the present application are illustrated in the drawings.

The bending technique of bending a bonding region to the back of a display panel is a core technique adopted by a full-screen bezel-less display panel. The display panel includes a display region and a non-display region. The non-display region includes a bend region and a bonding region. The bend region is located between the display region and the bonding region. The bend region includes a substrate and wiring disposed on the substrate. To improve the screen-to-body ratio of the display panel, an R angle of the bend region (that is, the bend radius of the bend region) needs to be configured to be as small as possible so that the width of the bezel, occupied by the bend region, of the display panel is reduced, and the screen-to-body ratio of the display panel is improved. In the related art, to reduce the R angle of the bend region and the stress acting on the wiring while the bend region is being bent, a thinning process is performed on the bend region. In the thinning process, the inorganic layer of the bend region of the display region is removed. In this case, the thickness of the bend region is less than the thickness of the display region of the display panel and the thickness of the bonding region of the display panel, and the substrate of the bend region is generally made of a PI (polyimide) material with a soft texture. Therefore, while the bend region is being bent, a stress applied by the display region and the bonding region both connected to the bend region acts on the bend region, resulting in phenomena such as distorted bending in the bend region and resulting in wiring breakage. In the case where the size of the bend region is relatively great, the stress applied by the display region and the bonding region to the bend region is relatively great and directions of the stress are different, so that phenomena such as distorted bending occur more easily.

Based on the preceding problem, embodiments of the present application provide a display panel. The display panel includes a substrate.

The substrate includes a bonding region and a bend region connected to the bonding region. The substrate further includes a support block disposed corresponding to the bend region and the bonding region and disposed on a side of the substrate facing away from a display surface. The maximum thickness of the support block located in the bonding region is greater than the maximum thickness of the support block located in the bend region.

Optionally, the support block is disposed on a side of the substrate facing away from the display surface. Therefore, the thickness of the support block refers to the perpendicular distance between the substrate and the surface of the support block facing away from the substrate, that is, the thickness of the support block along the direction perpendicular to the substrate. With the bend region being bent, the bend region may form a receiving groove, and the support block may be partially disposed in the receiving groove formed by the bend region and may extend to the bonding region so that the support block may support the bend region. Moreover, the support block is fixed relative to the bend region and the bonding region so that the support block is prevented from separating from the bend region and the bonding region due to an external force, and the support block may better support the bend region. Moreover, the maximum thickness of the support block located in the bonding region is greater than the maximum thickness of the support black located in the bend region, so that in terms of the thickness, the support block located in the bonding region may well replace a raising block in the related art, and thus there is no need to dispose the raising block additionally. Therefore, alignment is not required during attachment and the attachment difficulty is reduced.

In the present embodiment, the support block is disposed on a side of the substrate of the bend region facing away from the display surface so that the thickness of the bend region is increased, the capability of the bend region to bear the distortion stress is improved, the distorted bending of the bend region caused by the stress applied by the display region and the bonding region to the bend region is prevented, and the risk of wiring breakage in the bend region of the display panel is reduced. Moreover, the support block is further disposed in the bonding region and connects the bend region and the bonding region as a whole so that the support block may support the bend region and the bonding region, the distorted bending of the bend region caused by the stress applied by the display region and the bonding region to the bend region is further prevented, the occurrence of a dead fold is prevented while the bend region is being bent, and the risk of wiring breakage in the bend region of the display panel is reduced, and the yield of the display panel is improved. Moreover, the maximum thickness of the support block located in the bend region is less than the maximum thickness of the support block located in the bonding region, and the increased thickness, caused by the support block, of the bend region is relatively small, so that the thickness of the bend region is prevented from being too great to cause the bend radius of the bend region to be too great, and the screen-to-body ratio of the display panel is prevented from being reduced. Meanwhile, the part of the support block located in the bonding region replaces a raising block in the related art and thus there is no need to dispose the raising block additionally. Therefore, alignment is not required during attachment and the attachment difficulty is reduced.

Furthermore, the bend region of the display panel may include the non-display region of the display panel, and may include part of the display region of the display panel.

The solution of the present application is described with reference to the drawings.

Figure 2:
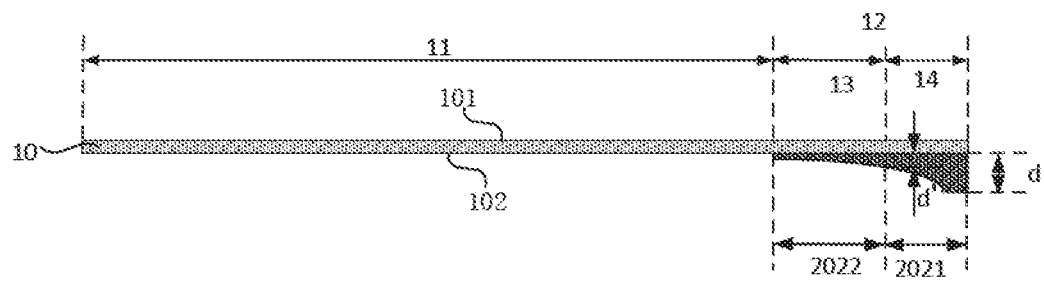
FIG. 2 is a sectional view taken along section A-A' of FIG. 1.
Figure 3:
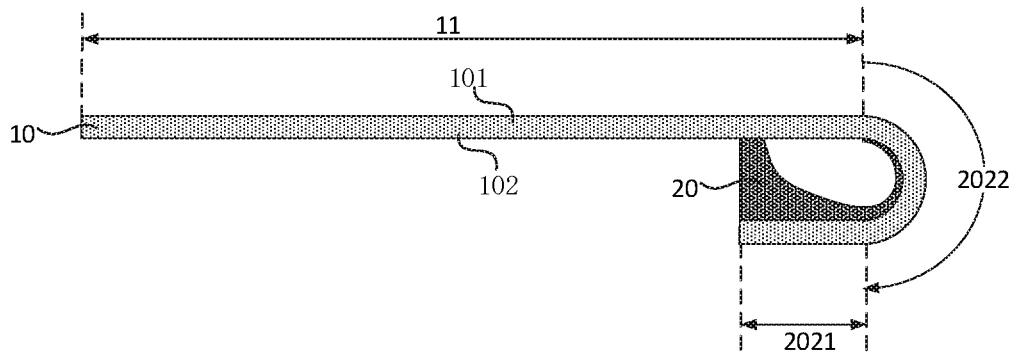
FIG. 3 is a schematic view of a display panel in a bent state according to an embodiment of the present application.

In an embodiment, referring to FIGS. 1 to 3, the display panel includes a substrate 10 and a support block 20. The substrate 10 includes a display region 11 and a non-display region 12 on the periphery of the display region 11. A bonding region 14 is located in the non-display region 12. A bend region 13 is located between the display region 11 and the bonding region 14. After the bend region 13 is bent, the display panel in a bent state as shown in FIG. 3 is formed.

The support block 20 is disposed in the bend region 13 and the bonding region 14, and disposed on an inner side of the bending part of the bend region 13. For example, the substrate 10 includes a first surface 101 and a second surface 102. The bend region 13 is bent to the direction of the second surface 102 of the substrate 10, and the support block 20 is disposed on the second surface 102 of the substrate 10. Referring to FIG. 2 and FIG. 3, the maximum thickness of the support block 20 located in the bonding region 14 is greater than the maximum thickness of the support block 20 located in the bend region 13.

Optionally, as shown in FIG. 2 and FIG. 3, the support block 20 includes a first part 2021 located in the bonding region 14 and a second part 2022 located in the bend region 13, and the maximum thickness d of the first part 2021 is greater than the maximum thickness d' of the second part 2022. In one aspect, the support block 20 thickens the bend region 13, improves the capability of the bend region 13 to bear the distortion stress. Therefore, a distorted bending of the bend region 13 caused by the stress applied by the display region 11 and the bonding region 14 to the bend region 13 is prevented. Moreover, the risk of wiring breakage in the bend region 13 of the display panel is reduced. Moreover, the support block 20 extends to the bonding region 14 and connects the bend region 13 and the bonding region 14 as a whole so that the support block 20 may support the bend region 13 and the bonding region 14, therefore the distorted bending of the bend region caused by the stress applied by the display region 11 and the bonding region 14 to the bend region 13 is further prevented, the occurrence of the dead fold is prevented while the bend region 13 is being bent, the risk of wiring breakage in the bend region 13 of the display panel is further reduced, and the yield of the display panel is improved. Furthermore, the maximum thickness d' of the support block 20 located in the bend region 13 is less than the maximum thickness d of the support block 20 located in the bonding region 14. Therefore, the increased thickness, caused by the support block 20, of the bend region 13 is relatively small so that the thickness of the bend region 13 is prevented from being too great to cause the bend radius of the bend region 13 to be too great, and the screen-to-body ratio of the display panel is prevented from being reduced. Meanwhile, the support bock located in the bonding region replaces a raising block in the related art and thus there is no need to dispose the raising block additionally. Therefore, alignment is not required during attachment and the attachment difficulty is reduced.

Figure 4:
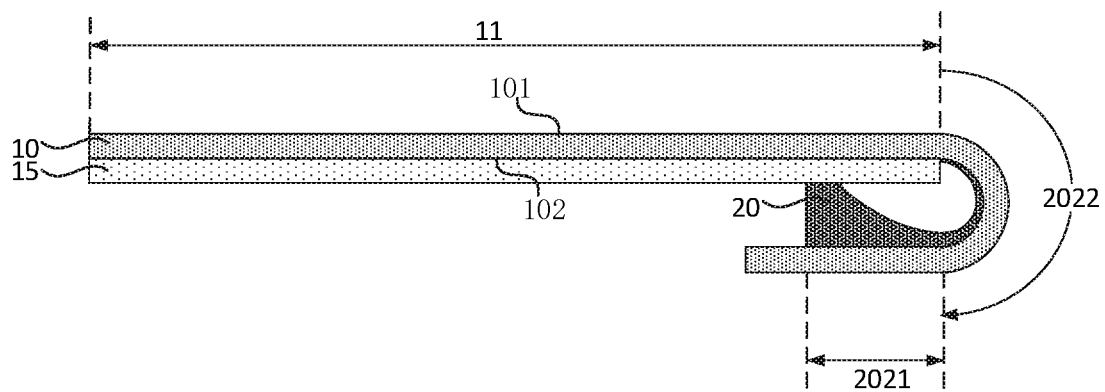
FIG. 4 is a schematic view of a display panel in a bent state according to another embodiment of the present application.

In an embodiment, referring to FIG. 4, the substrate further includes a first region. The first region is located on a side of the bend region 13 away from the bonding region 14. A support layer 15 is disposed corresponding to the first region. The support layer 15 is disposed on a side of the substrate 10 facing away from the display surface. After the bend region 13 is bent, the support block 20 located in the bonding region 14 and having the maximum thickness abuts a side of the support layer 15 facing away from the substrate 10.

Optionally, the substrate 10 includes the first surface 101 and the second surface 102. The first surface 101 may be a display surface. In the case where the bend region 13 is bent to a side facing away from the display surface, that is, to the direction of the second surface 102 of the substrate 10, the support layer 15 is disposed on the second surface 102 of the substrate 10. The support layer 15 is disposed in the first region so that the support layer 15 may support the first region of the display panel.

In the case where the bend region 13 only includes the non-display region 12, the first region is the display region 11 of the display panel as exemplarily shown in FIG. 4. In the case where the bend region 13 includes part of the display region 11, the first region is the part of the display region 11.

In an embodiment, referring to FIG. 4, after the bend region 13 is bent, the bonding region 14 is disposed in parallel with the first region so that the bend region 13 is bent by 180 degrees. Meanwhile, the perpendicular distance between a head end of the bend region 13 and a tail end of the bend region 13 is twice the bend radius of the bend region 13, so that the bending shape of the bend region 13 is in a semi-arc shape and dead fold may be effectively prevented. In the case where the display panel includes the support layer 15, the support block 20 in the bonding region 14 abuts the support layer 15. In this case, the perpendicular distance between the head end of the bend region 13 and the tail end of the bend region 13 is a sum of the maximum thickness, perpendicular to the substrate 10, of the support block 20 located in the bonding region 14 and the thickness of the support layer 15 along a direction perpendicular to the plane where the substrate 10 is located.

Furthermore, after the thickness of the support layer 15 is determined, the maximum thickness of the support block 20 in the bonding region 14 may be changed according to the requirement on the R angle. In the case where the bend region 13 is required to occupy a relatively wide bezel of the display panel, that is, in the case where the requirement on the R angle is relatively low and the R angle may be configured to be relatively large, it is feasible to configure the maximum thickness of the support block 20 in the bonding region 14 to be relatively great. In the case where the bend region 13 is required to occupy a relatively narrow bezel of the display panel, that is, in the case where the requirement on the R angle is relatively high and the R angle is required to be relatively small, it is feasible to configure the maximum thickness of the support block 20 in the bonding region 14 to be relatively small. Therefore, it is feasible to adjust the bend radius of the bend region 13 by adjusting the maximum thickness of the support block 20 in the bonding region 14 to so as to satisfy different requirements on the display panel.

Figure 5:
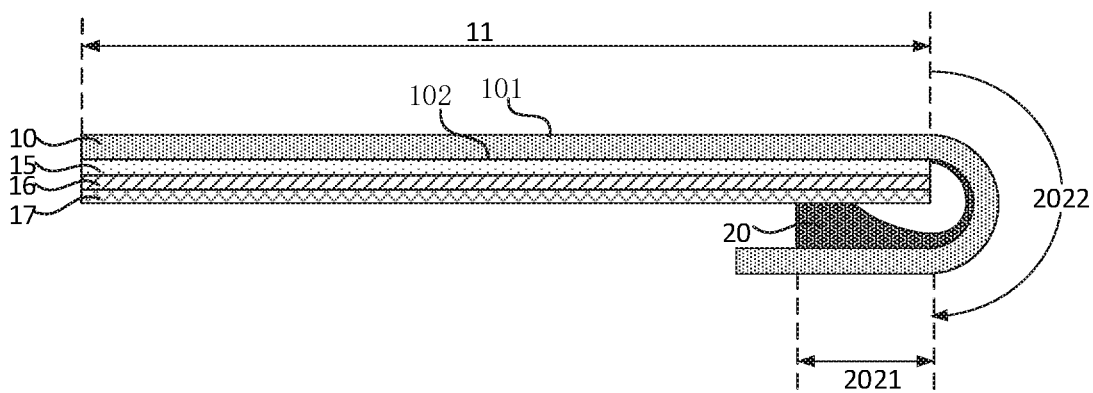
FIG. 5 is a schematic view of a display panel in a bent state according to another embodiment of the present application.

In an embodiment, referring to FIG. 5, the display panel further includes a buffer layer 16 and a heat dissipation layer 17.

The buffer layer 16 is used for buffering the stress acting on the display panel and protecting the display panel. The buffer layer 16 may be foam. The heat dissipation layer 17 is used for accelerating the dissipation of the heat generated during the display process of the display panel so that the temperature of the display panel is prevented from being too high and the display panel is protected. In the case where the display panel includes the buffer layer 16 and the heat dissipation layer 17, along the direction perpendicular to the plane where the substrate 10 is located, the sum of the maximum thickness of the support block 20 in the bonding region 14, the thickness of the support layer 15, the thickness of the buffer layer 16, and the thickness of the heat dissipation layer 17 is equal to twice the bend radius of the bend region 13.

Figure 6:
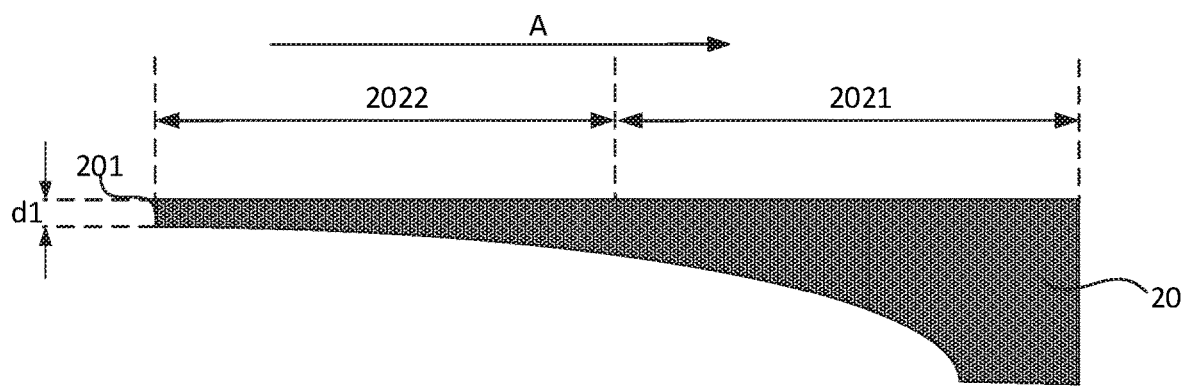
FIG. 6 is a schematic view of a support block according to an embodiment of the present application.

In an embodiment, referring to FIGS. 2, 4 and 6, the thickness of a side, away from the bonding region 14, of the support block 20 located in the bend region 13 is less than or equal to the thickness of any other part of the support block 20 located in the bend region 13.

Optionally, as shown in FIGS. 2, 4 and 6, a side, away from the bonding region 14, of the support block 20 located in the bend region 13 is a first surface 201 of the support block 20. The length d1, perpendicular to the substrate 10, of the first surface 201 is the thickness of a side, away from the bonding region 14, of the support block 20 located in the bend region 13. In the case where the thickness of a side, away from the bonding region 14, of the support block 20 located in the bend region 13 is less than or equal to the thickness of any other part of the support block 20 located in the bend region 13, the thickness of a side, away from the bonding region 14, of the support block 20 located in the bend region 13 is the minimum thickness of the support block 20.

Because the first surface 201 is located at the starting position of the bending, when the thickness of the support block 20 at the starting position is too great, in one aspect, the bending difficulty of the bend region 13 may increase accordingly; and in another aspect, the support block 20 may collide with other structures disposed on the second surface 102 in the first region of the substrate 10, and the bending difficulty is increased. For example, the other structures may be the support layer 15 in FIG. 4 and the buffer layer 16 and the heat dissipation layer 17 in FIG. 5. The thickness of a side, away from the bonding region 14, of the support block 20 located in the bend region 13 is configured to be less than or equal to the thickness of any other part of the support block 20 located in the bend region 13, that is, the thickness of a side, away from the bonding region 14, of the support block 20 located in the bend region 13 is configured to be the thickness of the support block 20. In this manner, the support block 20 may better support the bend region 13 while the bending difficulty of the bend region 13 may be reduced, the distorted bending of the bend region 13 caused by stress applied by the first region and the bonding region 14 to the bend region 13 is prevented, and wiring breakage is prevented.

With reference to FIGS. 2, 4 and 6, in the case where the display panel includes the support layer 15, if a side, away from the bonding region 14, of the support block 20 located in the bend region 13 is too thick, while the bend region 13 is being bent, the first surface 201 collides with the support layer 15 and a collision force exists between the bend region 13 and the support layer 15. The greater the bending angle is, the greater the collision force is, so that the bending difficulty of the bend region 13 is increased. Therefore, the thickness of a side, away from the bonding region 14, of the support block 20 located in the bend region 13 cannot be too great. Meanwhile, the thickness of a side, away from the bonding region 14, of the support block 20 located in the bend region 13 cannot be too small so that the support block 20 is prevented from ineffectively supporting and fixing the bend region 13. Therefore, the thickness range of a side, away from the bonding region 14, of the support block 20 located in the bend region 13 is 5-30 µm. In this manner, the bending difficulty of the bend region 13 may be prevented from increasing and the supporting and fixing effects of the support block 20 may be guaranteed.

Figure 7:
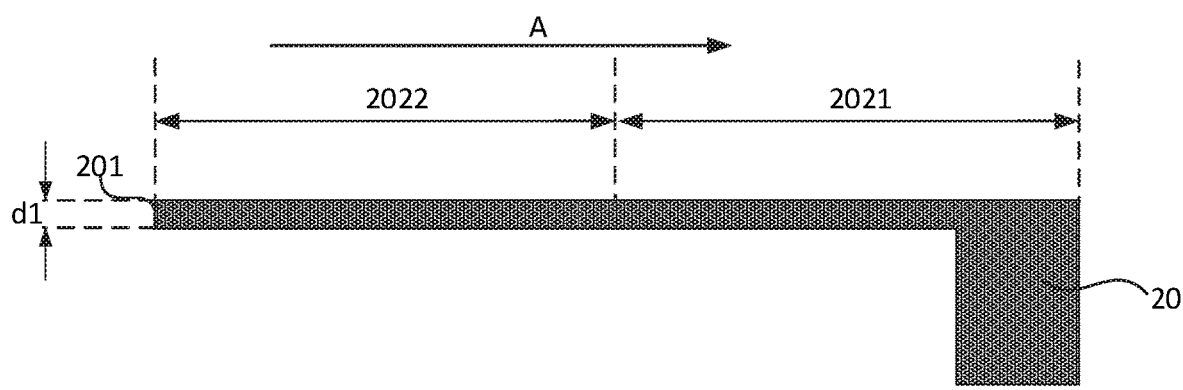
FIG. 7 is a schematic view of a support block according to another embodiment of the present application.

Furthermore, in an embodiment, as shown in FIG. 7, in the case where the thickness of a side, away from the bonding region, of the support block 20 located in the bend region is equal to the maximum thickness of the support block 20 located in the bend region, the support block 20 located in the bend region may be configured to be uniform in thickness. In this case, the support block 20 may support and fix the bend region.

In an embodiment, referring to FIGS. 2, 6 and 7, the thickness of a side, away from the bonding region 14, of the support block 20 located in the bend region 13 is less than or equal to the minimum thickness of the support block 20 located in the bend region 14.

Optionally, in the case where the support block 20 located in the bend region 13 is too thick, the bend region 13 tends to be difficult to bend. Therefore, the thickness of the support block 20 in the bend region 13 may be less than or equal to the minimum thickness of the support block 20 in the bonding region 14. Moreover, in the case where the thickness of the support block 20 in the bend region 13 is not uniform in thickness, the thickness of a side, away from the bonding region 14, of the support block 20 located in the bend region 13 may be configured to be the smallest, that is, the thickness of a side, away from the bonding region 14, of the support block 20 located in the bend region 13 is less than the minimum thickness of the support block 20 located in the bonding region 14. In this manner, the bending difficulty of the bend region 13 may be prevented from increasing and the supporting and fixing effects of the support block 20 may be guaranteed. Generally, the thickness of a side, away from the bonding region 14, of the support block 20 located in the bend region 13 may be configured to be the minimum thickness of the support block 20. In this case, the thickness of a side, away from the bonding region 14, of the support block 20 located in the bend region 13 may be less than or equal to the minimum thickness of the support block 20 located in the bonding region 14.

In an embodiment, referring to FIGS. 2, 6 and 7, the maximum thickness of the support block 20 located in the bend region 13 is less than or equal to the minimum thickness of the support block 20 located in the bend region 14.

Optionally, the maximum thickness of the support block 20 located in the bend region 13 is configured to be less than or equal to the minimum thickness of the support block 20 located in the bonding region 14. In this manner, the thickness of the support block 20 located in the bend region 13 is guaranteed to be less than or equal to the thickness of the support block 20 located in the bonding region 14. In this case, the thickness of the support block 20 located in the bend region 13 is less than or equal to the thickness of the support block 20 located in the bonding region 14. In this manner, the bending difficulty caused by too great thickness of the bend region 13 is prevented while the support block 20 may support the bend region 13. Moreover, in terms of the thickness, the support block 20 located in the bonding region 14 may well replace a raising block in the related art. Therefore, alignment is not required during attachment and the attachment difficulty is reduced.

In an embodiment, referring to FIGS. 2 to 6, along the direction A from the bend region 13 to the bonding region 14, the thickness, perpendicular to the substrate 10, of the second part 2022 of the support block 20 located in the bend region 13 increases gradually.

Optionally, along the direction A from the bend region 13 to the bonding region 14, there is a decreasing possibility that the support block 20 collides with other structures disposed on the second surface 102 in the display region 11. Therefore, along the direction A from the bend region 13 to the bonding region 14, the thickness of the support block 20 located in the bend region 13 may be configured to increase gradually so that the thickness of the support block 20 located in the bend region 13 becomes greater. In this manner, in one aspect, the support block 20 may be prevented from colliding with other structures disposed on the second surface 102 in the display region 11 and the bending difficulty of the bend region 13 may be prevented from increasing; in another aspect, the thickness of the support block 20 located in the bend region 13 may be increased more and the support block 20 may better support the bend region 13. Furthermore, along the direction A from the bend region 13 to the bonding region 14, the thickness of the support block 20 is configured to increase gradually so that the difference between the thickness of the support block 20 in the bend region 13 and the thickness of the support block 20 in the bonding region 14 may be reduced, the dead fold of the surface of the support block 20 facing away from the substrate 10 may be prevented from occurring at the junction of the bend region 13 and the bonding region 14, and the stress concentration at the junction of the bend region 13 and the bonding region 14 may be reduced.

With continued reference to FIG. 6, along the direction A from the bend region 13 to the bonding region 14, the thickness of the support block 20 increases continuously. A side, away from the substrate 10, of the support block 20 located in the bend region 13 may be configured as a concave curve shown in FIG. 6, and may be a convex curve. The manner in which the distance from a side, being away from the substrate 10, of the support block 20 located in the bend region 13 to the substrate 10 continuously increases along the direction A is not limited in the present application.

Figure 8:
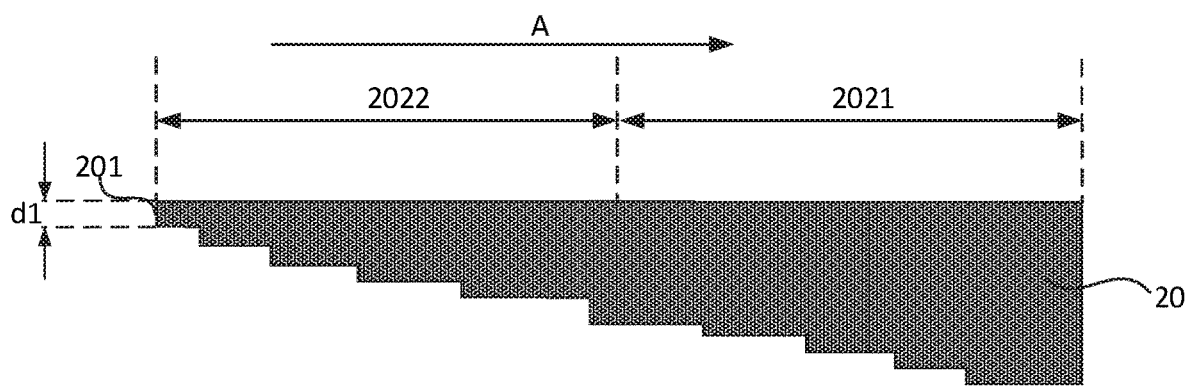
FIG. 8 is a schematic view of a support block according to another embodiment of the present application.

In an embodiment, referring to FIG. 8, along the direction A from the bend region to the bonding region, the thickness of the support block 20 increases stepwise.

Optionally, along the direction A from the bend region to the bonding region, the surface, away from the substrate 10, of the support block 20 located in the bend region may be a stepwise surface. The number of steps on a side, away from the substrate 10, of the support block 20 located in the bend region and the difference between thicknesses of adjacent steps are not limited in the present application.

Figure 9:
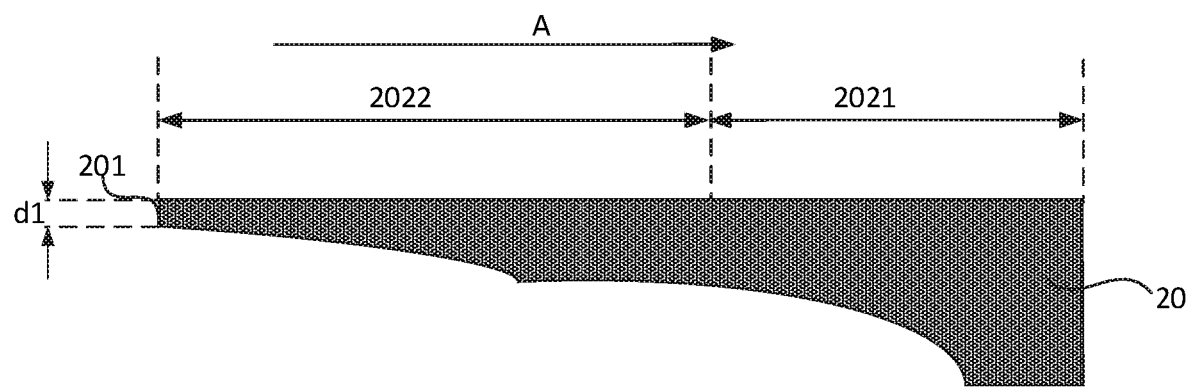
FIG. 9 is a schematic view of a support block according to another embodiment of the present application.

In an embodiment, referring to FIG. 9, along the direction A from the bend region to the bonding region, the thickness of the support block 20 located in the bend region changes in a wave shape.

A side, away from the substrate 10, of the support block 20 located in the bend region changes in a wave shape. That is, the thickness of the support block 20 located in the bend region changes in a wave shape. Moreover, the thickness, at the apex of the wave, of the support block 20 is less than or equal to half of the bend radius. In this manner, the thickness of the support block 20 is prevented from being too small to have no obvious supporting and fixing effects on the bend region, or the thickness of the support block 20 is prevented from being too great to make the thickness of the bend region too great and make the bend radius great while the bend region is being bent.

In an embodiment, at least one part of the support block located in the bonding region is uniform in thickness.

Optionally, as shown in FIGS. 6 to 9, along the direction A from the bend region to the bonding region, the thickness of the support block 20 located in the bonding region increases and then remains unchanged. That is, the support block 20 in the bonding region includes a part with a uniform thickness, and a plane formed by the part, with a uniform thickness, of the support block 20 located in the bonding region is in contact with the second surface of the substrate, so that the bend region is fixed.

Figure 10:
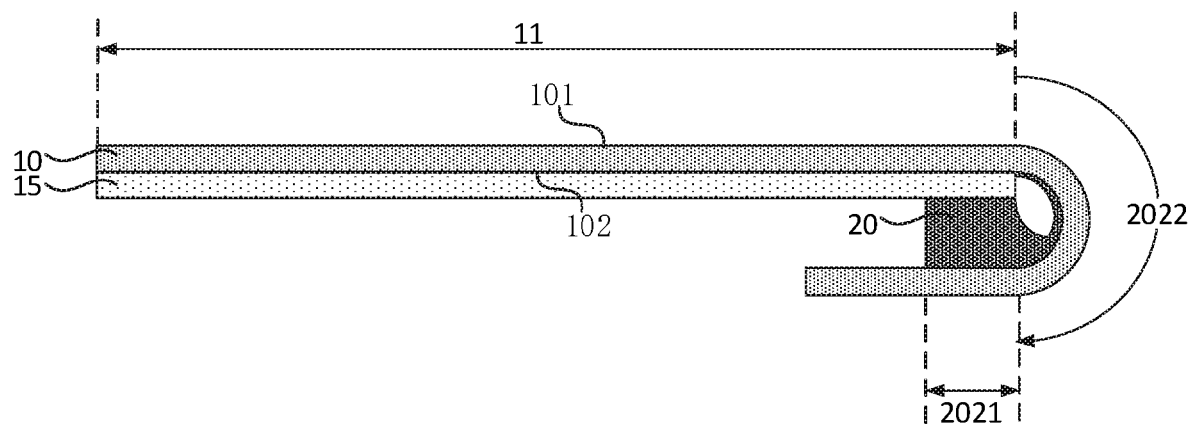
FIG. 10 is a schematic view of a display panel in a bent state according to another embodiment of the present application.

In an embodiment, referring to FIG. 10, the thickness of the support block 20 located in the bonding region is a fixed value, that is, the support block 20 located in the bonding region is uniform in thickness. In this case, the support block 20 may support and fix the bend region without affecting the bending of the bend region, and the contact area of the support block 20 with the second surface 102 of the substrate 10 may be increased, so that the support block 20 may be well fixed and the bending of the bend region may be well fixed.

Furthermore, the support block is made of an organic material. The support block is configured to be made of an organic material so that the stress acting on the bend region while the bend region is being bent may be better relieved and the risk of wiring breakage in the bend region may be reduced. For example, the support block may be made of a PI (polyimide) material.

Moreover, the support block may be formed by coating, that is, glue may be applied to the non-display region of the second surface of the substrate so that the glue is formed into the shape of the support block provided by embodiments of the present application. Alternatively, the support block may be separately made of an organic material. During the manufacturing process of the display panel, the support block is pasted to the non-display region of the second surface of the substrate by the manner of pasting. In the case where the display region of the second surface is provided with other structures, the support block may be pasted to the non-display region when other structures are pasted.

Furthermore, the display panel in the embodiments of the present application may be any display panel involving the bend region. Exemplarily, the display panel may be an organic light-emitting display panel, a liquid crystal display panel, a quantum dot light-emitting diode (QLED) display panel, a micro light-emitting diode (micro LED) display panel, a stretched organic light-emitting diode (OLED) display panel or the like.

Figure 11:
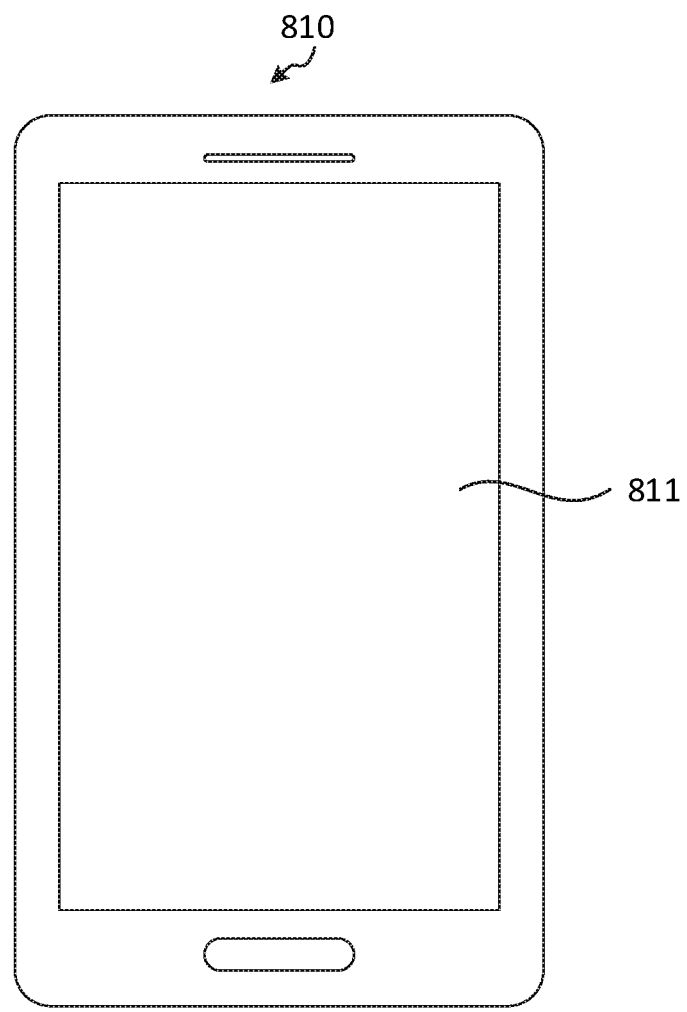
FIG. 11 is a schematic view of a display device according to an embodiment of the present application.

Embodiments of the present application further provide a display device. In an embodiment, referring to FIG. 11, the display device 810 includes the display panel 811 provided by any embodiments of the present application.

The display device 810 may be a display device with the display function, such as a mobile phone, a computer, and a smart wearable device, and embodiments of the present application are not limited thereto.

What is claimed is:
1. A display panel, comprising:
   a substrate, comprising a bonding region and a bend region connected to the bonding region; and
   a support block, disposed corresponding to the bend region and the bonding region and disposed on a side of the substrate facing away from a display surface, wherein a maximum thickness of the support block located in the bonding region is greater than a maximum thickness of the support block located in the bend region.

2. The display panel of claim 1, wherein
   a thickness of a side, away from the bonding region, of the support block located in the bend region is less than or equal to a thickness of any other part of the support block located in the bend region.

3. The display panel of claim 2, wherein the maximum thickness of the support block located in the bend region is less than or equal to the minimum thickness of the support block located in the bonding region.

4. The display panel of claim 3, wherein
along a direction from the bend region to the bonding region, a thickness, perpendicular to the substrate, of the support block located in the bend region increases gradually.

5. The display panel of claim 4, wherein
the thickness of the support block located in the bend region increases continuously or stepwise.

6. The display panel of claim 3, wherein
a thickness of the support block located in the bend region changes in a wave shape.

7. The display panel of claim 2, wherein
the thickness of the side, away from the bonding region, of the support block located in the bend region is less than or equal to a minimum thickness of the support block located in the bonding region, and a minimum thickness of the support block located in the bend region is in a range of 5-30 µm.

8. The display panel of claim 1, wherein the support block located in the bend region is uniform in thickness.

9. The display panel of claim 1, wherein a thickness of a side, away from the bonding region, of the support block located in the bend region is less than or equal to a minimum thickness of the support block located in the bonding region.

10. The display panel of claim 9, wherein the maximum thickness of the support block located in the bend region is less than or equal to the minimum thickness of the support block located in the bonding region.

11. The display panel of claim 10, wherein
along a direction from the bend region to the bonding region, a thickness, perpendicular to the substrate, of the support block located in the bend region increases gradually.

12. The display panel of claim 11, wherein
the thickness of the support block located in the bend region increases continuously or stepwise.

13. The display panel of claim 10, wherein
a thickness of the support block located in the bend region changes in a wave shape.

14. The display panel of claim 1, wherein
at least part of the support block located in the bonding region is uniform in thickness.

15. The display panel of claim 14, wherein
the support block located in the bonding region is uniform in thickness.

16. The display panel of claim 14, wherein
along a direction from the bend region to the bonding region, a thickness of the support block located in the bonding region increases and then remains unchanged.

17. The display panel of claim 1, wherein
the substrate further comprises a first region, and the first region is located on a side of the bend region away from the bonding region; and
the display panel further comprises a support layer disposed corresponding to the first region and disposed on the side of the substrate facing away from the display surface, and with the bend region being bent, the support block located in the bonding region and having the maximum thickness abuts a side of the support layer facing away from the substrate.

18. The display panel of claim 17, further comprising a buffer layer and a heat dissipation layer, wherein the buffer layer is disposed on the side of the support layer facing away from the substrate and the heat dissipation layer is disposed on a side of the buffer layer facing away from the support layer.

19. The display panel of claim 17, wherein with the bend region being bent, the bonding region is disposed in parallel with the first region.

20. A display device, comprising the display panel of claim 1.

* * * * *